J. F. COMEE.
CAR DOOR.
APPLICATION FILED NOV. 28, 1913.
1,230,567.
Patented June 19, 1917.
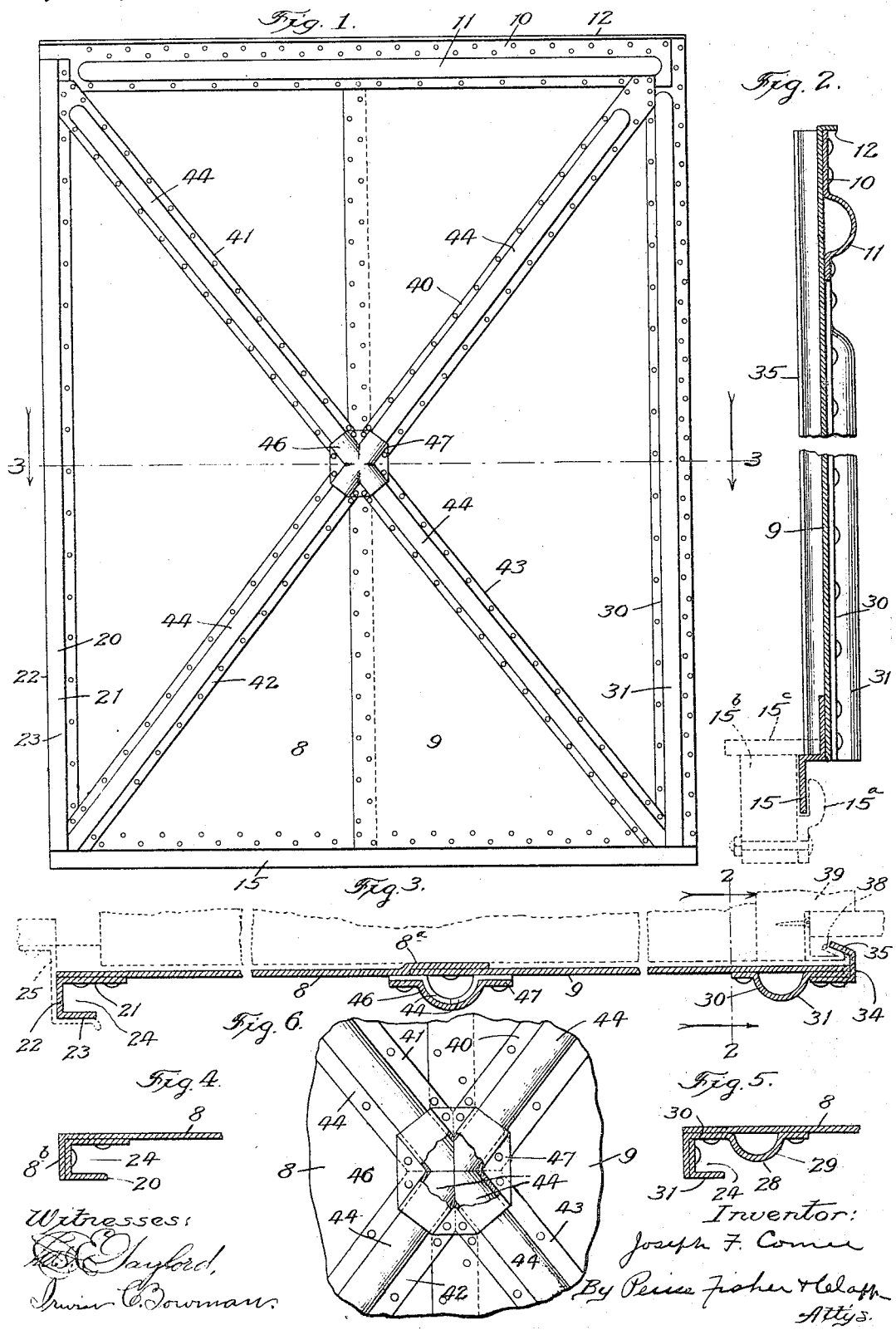

UNITED STATES PATENT OFFICE.

JOSEPH F. COMEE, OF CHICAGO, ILLINOIS, ASSIGNOR TO CAMEL COMPANY, OF CHICAGO, ILLINOIS, A CORPORATION.

CAR-DOOR.

1,230,567.   Specification of Letters Patent.   Patented June 19, 1917.

Application filed November 28, 1913. Serial No. 803,569.

*To all whom it may concern:*

Be it known that I, JOSEPH F. COMEE, a citizen of the United States, and resident of Chicago, in the county of Cook and State of Illinois, have invented certain new and useful Improvements in Car-Doors, of which I do declare the following to be a full, clear, and exact description.

The present invention has for its object to provide an improved construction of metal door more particularly designed for railway freight cars, and the invention consists in the features of improvement hereinafter described, illustrated in the accompanying drawing and particularly pointed out in the claims at the end of this specification.

Figure 1 is a view in side elevation of a metal door embodying my invention. Fig. 2 is a view in vertical cross section on a larger scale on a line inside the reinforcing bar at the rear edge of the door, the brace bars being omitted. Fig. 3 is a view in cross section on line 3—3 of Fig. 1. Fig. 4 is a view in cross section through the front edge of the door, showing a modified construction. Fig. 5 is a view similar to Fig. 4, but showing a further modification. Fig. 6 is an enlarged detail front view of the central portion of the door, a part of the center plate being broken away.

In the manufacture of metal doors for freight cars, it is extremely important that the door shall be very strong, to resist not only the outward thrusts from the contents of the car, but also the racking strains to which such doors in service are subjected; it is necessary, also, that the doors should be maintained as light as possible in order to insure their ease of operation and economy of cost. So, also, in the construction of metal doors for freight cars, it is desirable to provide the front and rear edges of the door with means whereby the exclusion of water, dust, cinders, and the like, shall be effected. My present construction of metal car door is designed to meet the several above mentioned requirements.

The body of the door is formed of plate metal and preferably of two metal plates 8 and 9 that have their inner vertical edges overlapping and suitably united by rivets or spot welding. Preferably, one of the plates 8 is offset as at 8ª to receive the lapping edge of the plate 9, as by this construction a flat and uniform outer surface is given to the plates. Across the top of the door extends a reinforcing top bar 10 that is formed with an outwardly projecting rib 11. This rib 11 extends approximately from end to end of the bar 10 but preferably the rib 11 terminates adjacent the ends of the bar 10 so that the channel formed by the interior of the rib 11 shall not be open to the weather at its ends. The bar 10 is attached to the outer face of the door by rivets or spot welding. The upper edge of the bar 10 is shown as formed with an outwardly turned flange 12 beneath which the usual door hangers or brackets will be attached. The bar 10 serves to give great strength to the upper portion of the door and coöperates with the brace bars, to be presently described, in resisting various strains to which the door will be subjected.

Across the bottom of the door extends an angle bar 15 the preferred shape of which is illustrated more particularly in Fig. 2 of the drawings. This angle bar 15 is shown as attached to the inner face of the plates 8 and 9 of the door and the lower member of the angle bar depends at a slight distance below the main body of the door for engagement with the usual or suitable guide brackets, one of which brackets 15ª is indicated by dotted lines as attached to the door plate or sill 15ᵇ on which rests the flooring 15ᶜ. It will be observed, by reference more particularly to Fig. 2, that the inner member of the angle bar 15 extends under the outward forward edge of the flooring 15ᶜ so that when the door is in closed position the angle bar interlocks with the front edge of the flooring 15ᶜ and thus prevents the danger of lifting the door. In other words, when the door is in closed position, the angle bar 15 being locked against outward movement by the bracket or brackets 15ª and against upward movement by the overlapping front edge of the flooring 15ᶜ, all danger of the door being forced upward or drawn outward by the pressure from within the car or by the suction of rapidly passing trains is avoided. This is a feature of importance, as a frequent source of accidents is due to the "side-swiping" of passing trains when the doors of freight cars are drawn outward from their bottoms. Moreover, it will be seen that inasmuch as the horizontal member of the angle bar 15 extends under the front edge of the floor 15ᶜ, while the lower vertical member of the angle bar extends adjacent the door sill 15$^b$, the angle bar serves to prevent the passage of dust, cinders, snow, and the like, into the car.

Along the front edge of the door and extending from top to bottom thereof is attached, by rivets or spot welding, a front reinforcing bar 20. Preferably, this bar 20 is formed as a channel bar that opens rearwardly to form a channel 24 into which snow, rain, or the like, will pass and from which it will drain away at the bottom of the door, the channel 24 being open at the bottom. As shown, the inner member 21 of the channel bar 20 that is attached to the body of the door is wider than the outer member 23 that is connected by the member 22 to the inner member 21. This channel bar 20 is adapted to pass beneath the outer flange of a vertical stop plate 25 shown by dotted lines in Fig. 3, when the door is in closed position, the stop plate coöperating with the channel bar in effecting a water-tight joint at the front edge of the door.

In the modified form of the invention illustrated in Fig. 4 of the drawings, the front edge of the plate 8 of the door is flanged outwardly, as at 8$^b$ and to this outwardly turned flange 8$^b$ is attached one member of the channel bar 20, the inner member of the channel bar being attached, as by rivets or spot welding, to the plate 8 of the door. In the modified form of the invention shown in Fig. 5 of the drawings, a reinforcing bar 28 is shown as attached to the front edge of the door, this reinforcing bar 28 being formed with a rib 29 and with an outwardly turned flange 30, to which outwardly turned flange 30 is attached by rivets or spot welding an angle bar 31. By this means a channel 24 is formed at the front edge of the door to perform the function of the channel bar hereinbefore described.

From top to bottom of the rear edge of the door extends the rear reinforcing bar 30 that is attached by rivets or spot welding at suitable points. This rear reinforcing bar 30 is made with a rib 31 forming a channel that is open at the bottom but is closed adjacent its top as the rib terminates below the upper end of the reinforcing bar 30. On the rear edge of the door and from top to bottom thereof extends a channel bar 34. Preferably, this channel bar is formed separate from the metal plate 9 that comprises the rear portion of the door and separate also from the reinforcing bar 30, and is attached by rivets or spot welding to the outer face of the reinforcing bar 30, as clearly shown in Fig. 3 of the drawings. The inner member 35 of the channel bar 34 inclines inwardly and at a distance from the inner face of the plate metal body of the door and this inner member 35 is adapted to coöperate with a channel bar 38, shown by dotted lines as attached to the rear door post 39, in tightly closing the rear edge of the door against access of rain, snow, cinders, or the like. Both the reinforcing bar 30 and the channel bar 34 at the rear edge of the door serve to give strength thereto.

Extending diagonally across the outer face of the door from the top corners to the bottom corners thereof are the brace bars 40, 41, 42 and 43. Each of these brace bars is formed with a longitudinal rib 44. The ribs 44 of the bars 40 and 41 terminate adjacent the upper ends of these bars so that the channels formed by these ribs 40 are closed at their outer ends. The brace bars 40, 41, 42 and 43 are mitered at their inner abutting ends, as clearly indicated in Fig. 1, and across the abutting ends of these brace bars extends a center plate 46 that is shaped to set over the abutting ends of the ribs 44 of the several brace bars. The parts 47 of the center plate 46 between the ribs 44 are attached by riveting or spot welding to the flat surface of the brace bars, as clearly shown in Figs. 1 and 3. The center plate 46 not only covers the abutting ends of the brace bars but serves to greatly strengthen the door at such point.

From the foregoing description it will be seen that my improved door is of very simple and cheap construction, but by severe tests it has been found to resist great strains in all directions. My improved construction of door also affords the most effective means for excluding water, etc., at the front and rear edges of the door and at the bottom thereof.

Having thus described my invention, what I claim as new and desire to secure by Letters Patent, is—

1. A car door having a body formed of plate metal and having ribbed and flanged brace bars extending diagonally between its upper and lower corners, said brace bars meeting at the center of the door, and a center plate extending over the outer faces of the meeting portions of the brace bars, said center plate being provided with raised portions to set over the ribs of the brace bars and with base flanges to set over the flanges of the brace bars, and attaching means connecting said base flanges of the center plate with the flanges of said brace bars, substantially as described.

2. A car door, comprising a body formed of plate metal, and a U-shaped channel member extending from top to bottom of the door and having one of its side faces riveted thereto at the front edge of said door, said channel member being disposed so that its open side lies toward the rear end of said door.

3. A car door, comprising a body formed of plate metal, the front edge of said body being flanged outwardly, and a U-shaped channel member extending from top to bottom of the door and having one of its side faces riveted thereto at the front edge of said door and being disposed so that its open side lies toward the rear end of said door, said channel member abutting the flange on the front edge of the car door and being riveted thereto.

4. A car door, comprising a body formed of plate metal and having on its outer face at its rear edge a vertically disposed reinforcing member formed with a central channel and laterally projecting flanges, and a U-shaped channel bar straddling the rear edge of the door and riveted to said reinforcing member, said channel having a forwardly projecting flange disposed on the inner side of and at a distance from the inner face of the door and adapted to coöperate with a similar flange on the car body.

JOSEPH F. COMEE.

Witnesses:
  GEO. P. FISHER,
  J. G. ANDERSON.